United States Patent
Malik

(10) Patent No.: US 7,103,633 B1
(45) Date of Patent: Sep. 5, 2006

(54) METHOD AND SYSTEM FOR TRANSMITTING THE CAPABILITIES OF A FACSIMILE MACHINE OVER THE INTERNET

(75) Inventor: Naeem I. Malik, Fremont, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/560,566

(22) Filed: Apr. 28, 2000

(51) Int. Cl.
 G06F 15/16 (2006.01)
 G06F 3/12 (2006.01)
 H04N 1/00 (2006.01)
 H04N 1/32 (2006.01)

(52) U.S. Cl. .................. 709/206; 358/1.15; 358/442; 358/402

(58) Field of Classification Search ........ 709/277–228; 358/400–401; 375/211–219
 See application file for complete search history.

(56) References Cited

U.S. PATENT DOCUMENTS

| | | | |
|---|---|---|---|
| 5,621,894 A * | 4/1997 | Menezes et al. | 709/227 |
| 5,819,110 A | 10/1998 | Motoyama | |
| 5,872,845 A * | 2/1999 | Feder | 358/442 |
| 5,938,735 A | 8/1999 | Malik | |
| 5,949,978 A * | 9/1999 | Kondo et al. | 709/231 |
| 6,104,505 A * | 8/2000 | Malik | 358/434 |
| 6,335,966 B1 * | 1/2002 | Toyoda | 379/100.06 |
| 6,437,873 B1 * | 8/2002 | Maeda | 358/1.15 |
| 6,466,330 B1 * | 10/2002 | Mori | 358/1.15 |
| 6,493,103 B1 * | 12/2002 | Toyoda et al. | 358/1.15 |
| 6,865,187 B1 * | 3/2005 | Ghosh et al. | 370/431 |
| 2003/0112796 A1 * | 6/2003 | Kwan | 370/352 |
| 2004/0075872 A1 * | 4/2004 | Adler et al. | 358/442 |
| 2005/0031097 A1 * | 2/2005 | Rabenko et al. | 379/93.31 |

FOREIGN PATENT DOCUMENTS

JP 11331475 A * 11/1999

OTHER PUBLICATIONS

*Procedures for Document Facsimile Transmission in the General Switched Telephone Network*, ITU-T Recommendation T.30, adopted Jul. 1996, from Fascicle VII.2, pp. 255-304.
*TCP/IP Illustrated vol. 1*, W. Rivchard Stevens, 1994, Addison-Wesley, pp. 441-452.
Brochure of the Ricoh Internet Fax Option, Type 140, for Ricoh FAX4800L, 1998.

* cited by examiner

Primary Examiner—Wen-Tai Lin
(74) Attorney, Agent, or Firm—Oblon, Spivak, McClelland, Maier & Neustadt, P.C.

(57) ABSTRACT

A method and system for obtaining the capabilities of a facsimile machine. In facsimile transmission systems which utilize a communication medium in which a direct connection does not exist between the transmitting facsimile machine and the receiving facsimile machine, such as the Internet, there is usually not a polling of the capabilities of the receiving facsimile machine by the transmitting facsimile machine during the process of transmitting a communication. There is a communication over the Internet, for example, by way of an Internet electronic mail message, which requests the capabilities of the receiving fax machine. A response e-mail is transmitted so that the capabilities of the receiving facsimile machine are sent to the transmitting facsimile machine. The facsimile machines involved are not necessarily connected directly to the Internet but may be connected through transfer stations. The transfer stations are connected over a network such as the Internet and the electronic mail messages are transmitted between the transfer stations.

40 Claims, 15 Drawing Sheets

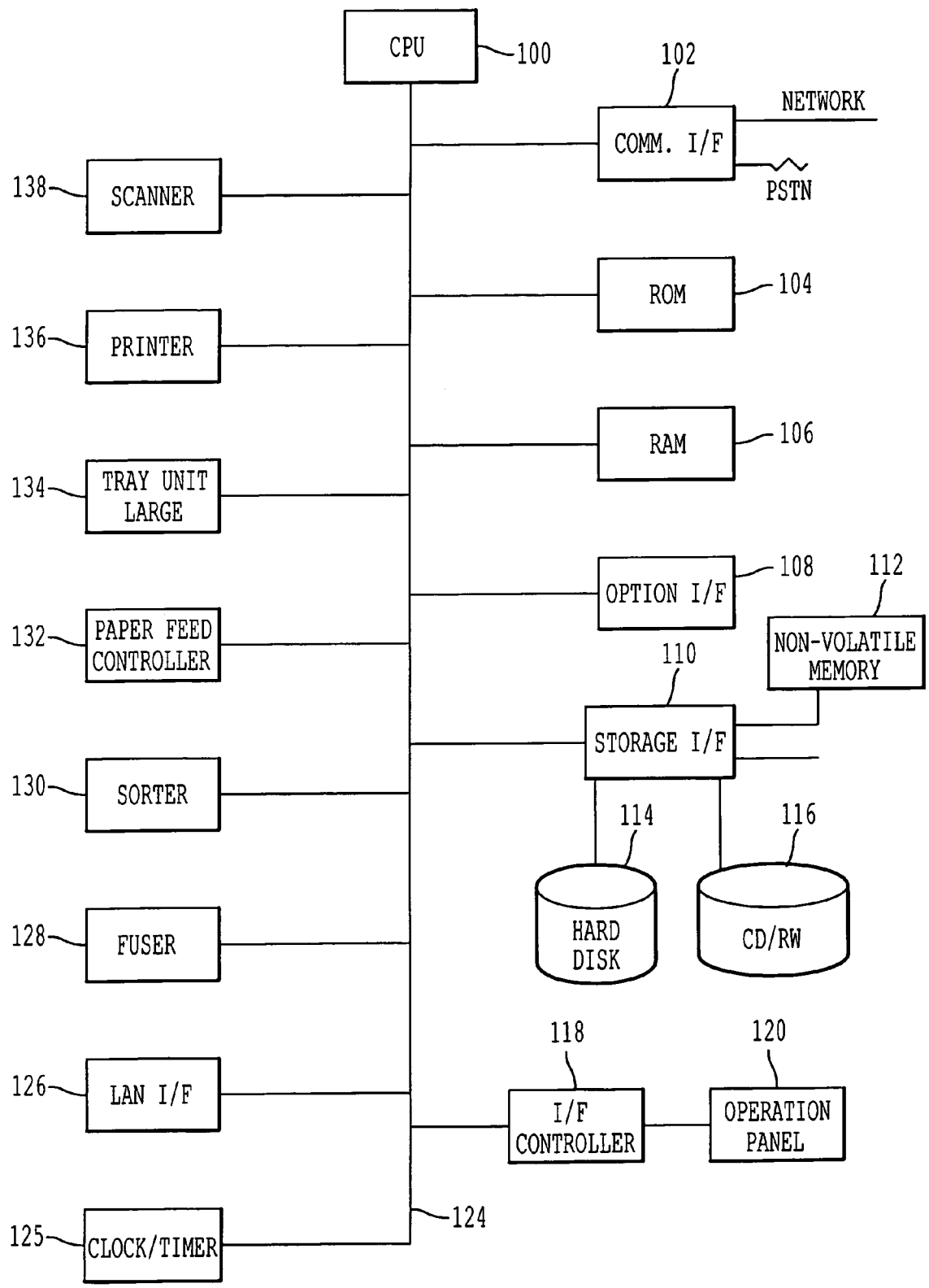

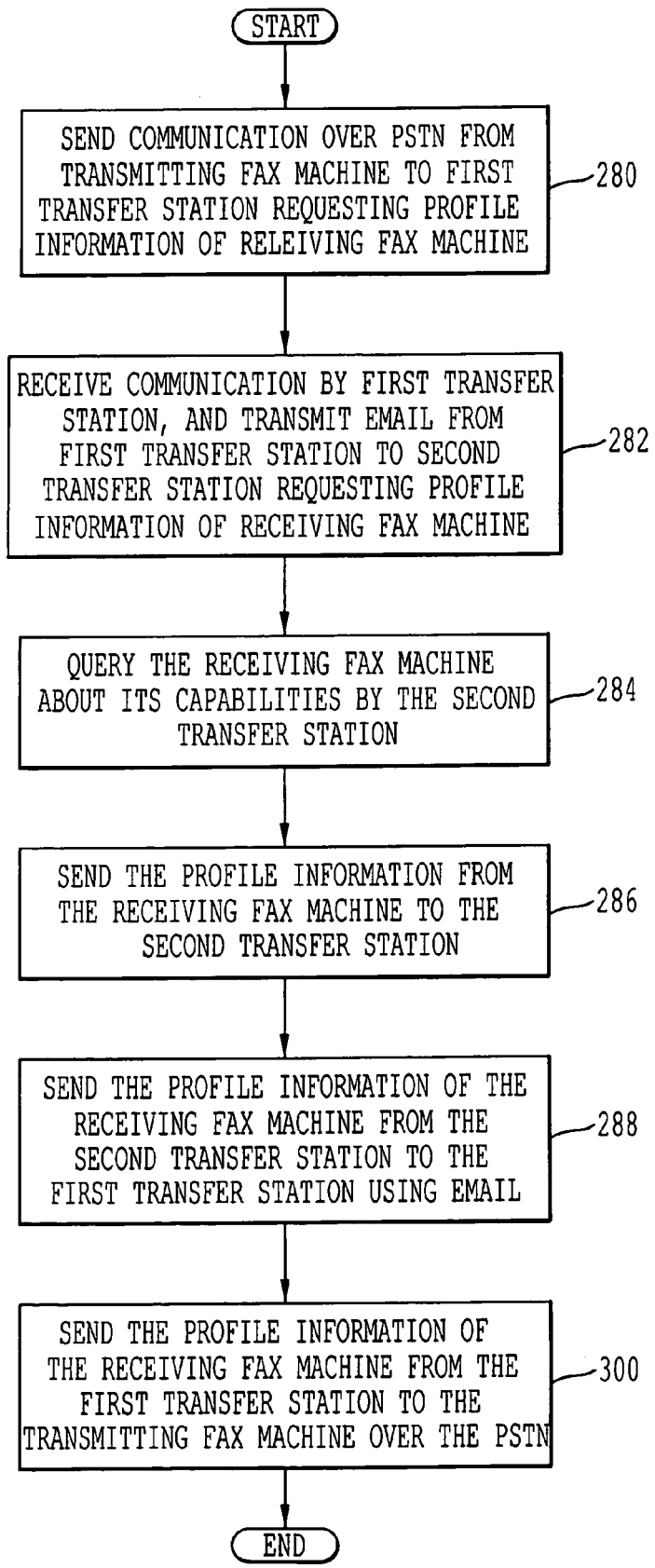

FIG. 9a

| | | |
|---|---|---|
| 362 — | TO: | EMAIL ADDRESS OF TRANSMITTING STATION |
| 364 — | SUB: | RESPONSE PROFILE: TELEPHONE NUMBER |

360

RESULT PROFILE:
1.    FAX STATION:
      CAPABILITIES
366 —
      a.
      b.
2.    FAX STATION:
      CAPABILITIES
      a.
      b.

| | | |
|---|---|---|
| 372 — | TO: | EMAIL ADDRESS OF TRANSFER FAX STATION |
| 374 — | SUB: | PROFILE: TELEPHONE NUMBER |

RESULT PROFILE:

380

METHOD AND SYSTEM FOR TRANSMITTING THE CAPABILITIES OF A FACSIMILE MACHINE OVER THE INTERNET

BACKGROUND OF THE INVENTION

1. Field of the Invention

This invention relates to the transmission of facsimiles over the Internet. The invention is more particularly related to the transmission of the capabilities of the receiving facsimile machine to the transmitting facsimile machine over the Internet. The invention is further related to the use of electronic mail messages to transmit the capabilities of the receiving facsimile machine over the Internet.

2. Description of the Related Art

The transmission of facsimiles over the Internet is known. For example, referring to FIG. 1, a facsimile machine 2 can transmit a conventional facsimile over a PSTN (Public Switched Telephone Network) to a transfer station 4. The transfer station 4 is a receiving facsimile machine which relays the facsimile transmission from the facsimile machine 2 over the Internet 8 to another transfer station 10. The transfer station 10 then transmits the relayed facsimile transmission over a PSTN to a receiving facsimile machine 12.

As an alternative to the use of a transfer station, a facsimile machine 6 can be used to transmit a facsimile over the Internet 8 without using a transfer station as an intermediary to the Internet. The facsimile is transmitted over the Internet 8 to the transfer station 10 in the form of an Internet electronic mail address. From the transfer station 10, a facsimile may be transmitted over the PSTN to a conventional facsimile machine 12. The description of the known system of FIG. 1 is based on Ricoh facsimile machine model 4800L having an Internet fax option, such as the Ricoh Internet fax option type 140, the specifications of both being incorporated herein by reference.

A shortcoming of conventional systems which utilize the Internet to transmit facsimiles which has been recognized by the present inventor is that the transmitting facsimile machine does not know the capabilities of the receiving facsimile machine. Conventional systems simply do not account for or permit the transmission of the capabilities of the receiving facsimile machine to the transmitting facsimile machine. Accordingly, the facsimile which is ultimately transmitted to the receiving facsimile machine in conventional systems is transmitted using low or minimal facsimile capabilities which serve as a common denominator among facsimile machines. Such a use of low facsimile capabilities, while assuring a successful facsimile transmission, has been determined by the inventor to not take advantage of the full capabilities of the facsimile machines.

SUMMARY OF THE INVENTION

Accordingly, it is an object of the invention to determine the capabilities of facsimile machines which are utilized to transmit facsimiles over the Internet. It is a further object of the invention to use Internet electronic mail to transmit the capabilities of the receiving facsimile machine to the transmitting facsimile machine. It is yet another object of the invention to transmit a facsimile over the Internet using the capabilities of the transmitting and/or receiving facsimile machines after these capabilities have been determined. These and other objects of the invention are accomplished by a facsimile transmission system and method constructed in accordance with the invention. The invention transmits the capabilities of the receiving facsimile machine, also referred to as a profile or profile information, to the transmitting facsimile machine over the Internet. Preferably, this transmitting of the profile information is performed by transmitting an Internet electronic mail message requesting the profile information, and transmitting a response over the Internet which contains the capabilities of the receiving facsimile machine.

The receiving facsimile machine, in one embodiment, is connected to a transfer station which may also be a facsimile machine utilizing a Public Switched Telephone Network (PSTN). This transfer station receives the electronic mail message or other Internet communication and makes an appropriate call over a PSTN to the facsimile machine. Although a PSTN is the preferred way of connecting the receiving facsimile machine to the transfer station, other manners of communication may be utilized. For example, the receiving facsimile machine may be connected directly to a computer network which is connected to the Internet.

The transmitting facsimile machine may be connected to a PSTN in a conventional network, or alternatively, is capable of directly generating electronic mail messages, or other communications which are transmitted over the Internet or another network. After the transmitting facsimile machine queries, over a computer network such as the Internet, the capabilities of the receiving facsimile machine, the transmitting facsimile machine may transmit the facsimile using the maximum capabilities of the receiving facsimile machine. For example, if the receiving facsimile machine is capable of receiving facsimiles in a "fine" or "detail" mode, or can use a half-tone method of communication, these higher quality images are utilized and transmitted, when desired.

Once the capabilities of the receiving facsimile machine are known by the transmitting facsimile machine, the transmitting facsimile machine stores these capabilities. This allows subsequent transmissions by the transmitting facsimile machine to the receiving facsimile machine to occur without further polling or querying of the receiving facsimile machine. In an embodiment, the capabilities of the receiving facsimile machine are stored in a memory location which may be used to store autodial or speed-dial telephone numbers of the transmitting facsimile machine.

When the receiving facsimile machine is being queried of its capabilities, there may be a display on the receiving facsimile machine that a querying is occurring and/or an identification of the machine which transmitted the query request. In addition to or alternative to displaying on a display of the receiving facsimile machine, a print out of the query operation and/or the identification of the transmitting facsimile machine may be generated at the receiving facsimile machine so that a person who is responsible for the receiving facsimile machine will know that a query has occurred. As yet another alternative, the query of the capabilities of the receiving facsimile machine may include the capabilities of the transmitting facsimile machine. As still another alternative, the receiving facsimile machine is simply called by a transfer station and during the initial call set up between the transfer station and the receiving facsimile machine, the transfer station conventionally queries the capabilities of the receiving facsimile machine, and as soon as these capabilities are determined the call over a PSTN is dropped. The transfer station then relays the capabilities back to the transmitting facsimile machine.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein:

FIG. 3 illustrates a facsimile machine and/or transfer station which may be utilized with the invention;

FIG. 7B is a flowchart utilized to obtain the capabilities of a receiving facsimile machine utilizing two different transfer stations;

FIGS. 9A and 9B are exemplary formats of electronic mail messages utilized to obtain the capabilities or profile information of the facsimile machines.

DETAILED DESCRIPTION OF THE PREFERRED EMBODIMENTS

Figure 1:
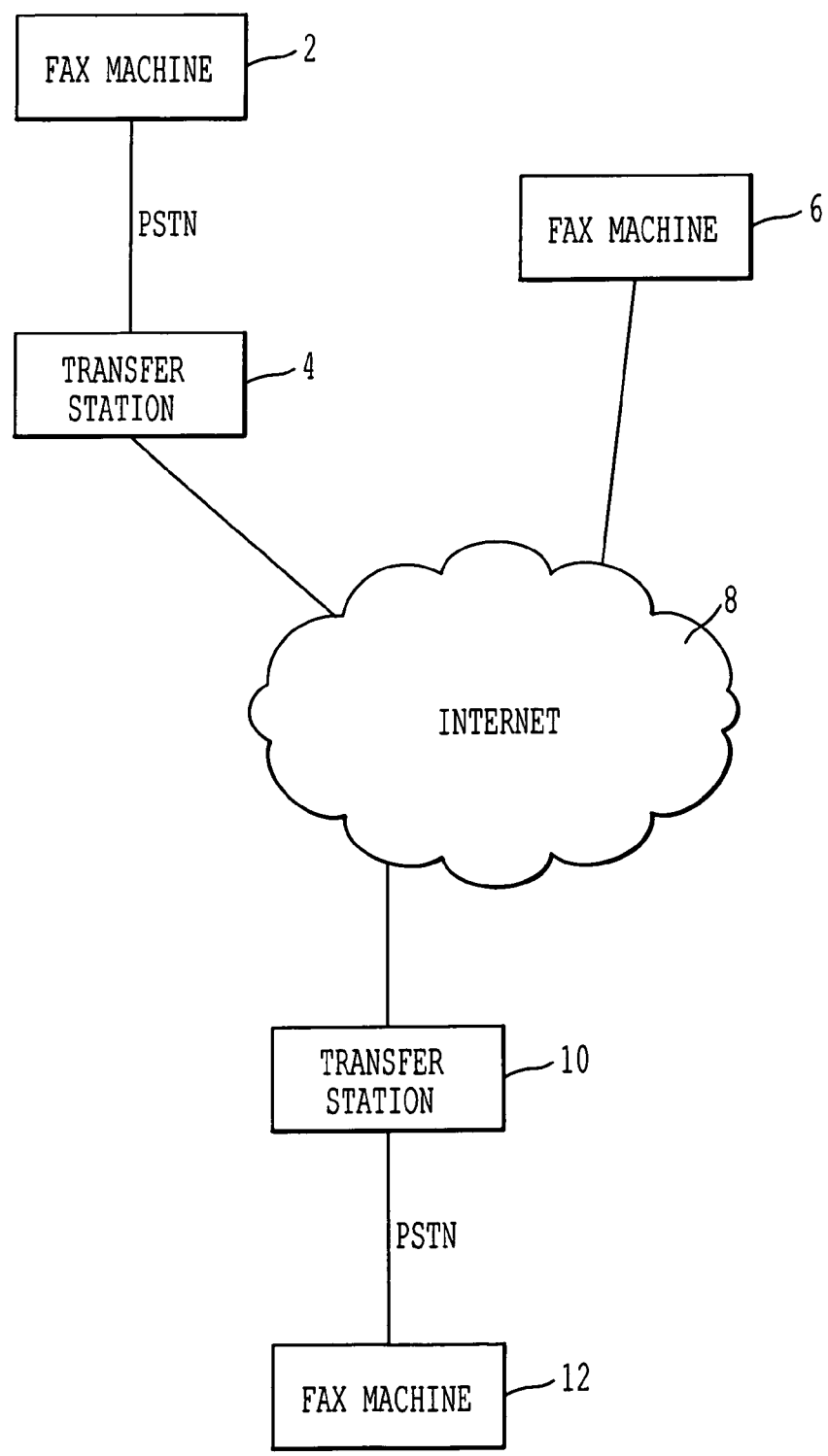
FIG. 1 illustrates a conventional system which transmits facsimiles over the Internet.
Figure 2A:
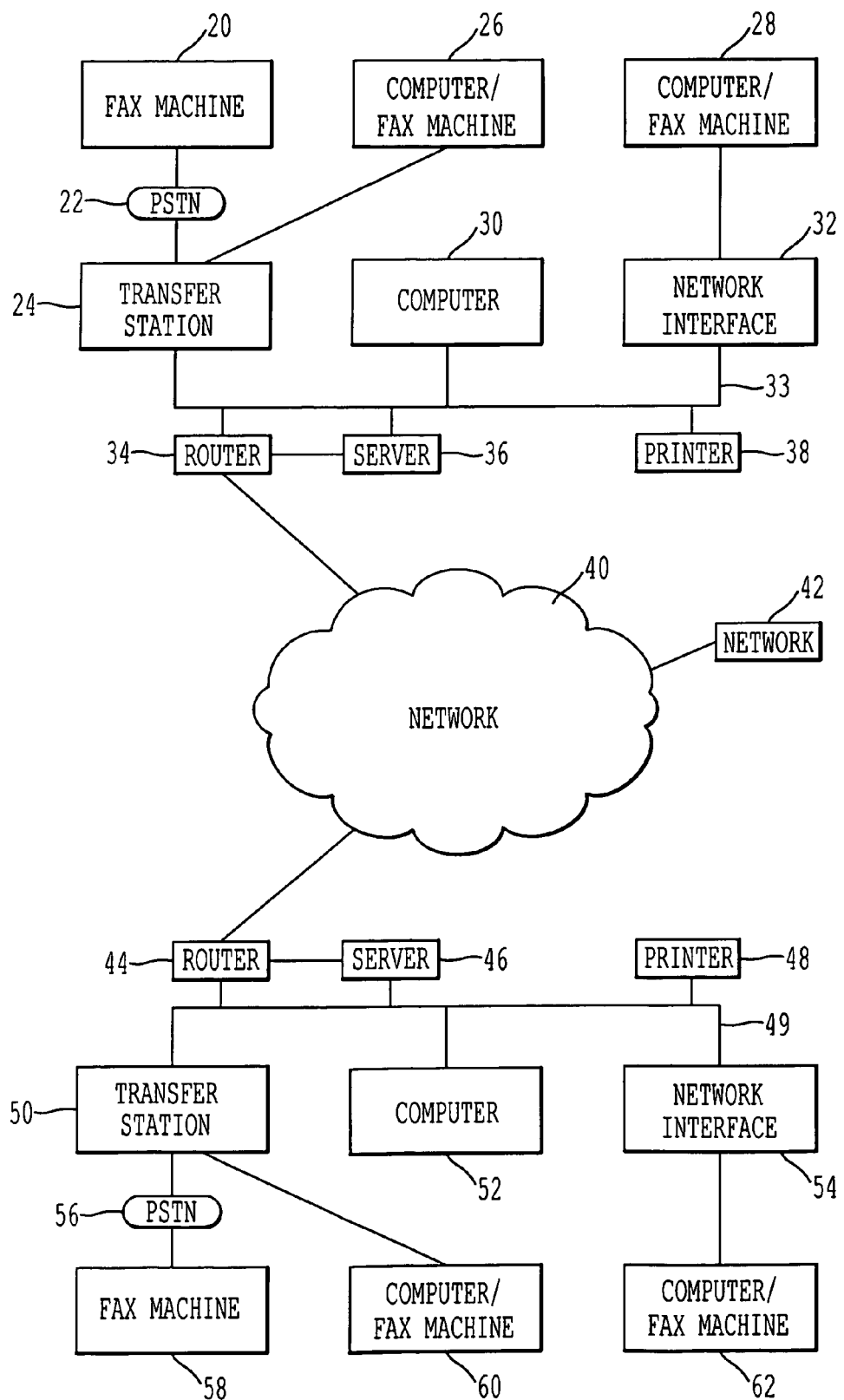
FIG. 2A illustrates a network diagram in which facsimiles and profile information are transmitted over a computer network.

Referring now to the drawings, wherein like reference numerals designate identical or corresponding parts throughout the several views, and more particularly to FIG. 2A thereof, there is illustrated a system diagram of a network utilized to implement the present invention. A facsimile machine 20 is connected over a Public Switched Telephone Network (PSTN) 22 to a transfer station 24. The facsimile machine 20 may have the general structure and components of a conventional stand-alone facsimile machine or multi-function machine, but will also include programming or software which allows it to generate a query which requests the capabilities of a receiving facsimile machine, and can also store the capabilities of the receiving facsimile machine. The transfer station 24 has the capability of receiving a facsimile transmitted over the PSTN 22. The transfer station 24 receives a request from the facsimile machine 20 and/or the computer/facsimile machine 26 and generates a message which requests the capabilities or profile information of a receiving facsimile machine.

The computer/fax machine 26 is also in communication with the transfer station 24, but these two devices do not communicate over a PSTN, but may communicate over another type of communication line such as a local area network (LAN), a wide area network (WAN), or any other type of communication medium including wireless communication mediums such as infrared or radio frequency communications, and also communications via a satellite. A computer/fax machine 28 may also be utilized to generate requests of the capabilities or profile information of a receiving facsimile machine, but the computer/fax machine 28 does not utilize the transfer station 24, but is connected to a network interface 32. The network interface 32 may have any structure which allows the computer/fax machine 28 to be connected to a computer network 33, and may be as complicated as a server, or may be as simple as an electrical receptacle or jack. The computer network 33 has connected thereto a computer 30, a router 34, a server 36, and a printer 38. The router 34 may be controlled by the server 36 and be used to route electronic communications from the network 33 to the network 40. The server 36 may be utilized to control the router 34, if desired. The printer 38 may be any type of printer including a laser printer, color printer, impact printer, ink jet printer, or any other desired type of printer.

The network 40 is preferably the Internet which is a well known computer network which connects computers from many different sources and locations. However, the present invention is not limited to only the use of the Internet, and other types of computer networks may be utilized, if desired. The network 40 may include satellite communication channels, wireless communication including radio frequency communications, infrared communication, and ultrasonic communications. A network 42 is connected to the network 40 and may include any type of network structure and may be arranged such as the upper half of FIG. 2A or the lower half of FIG. 2A. This means that the network 42 can include routers, servers, a transfer station, and various facsimile machines connected in any desired manner including the manners which are specifically illustrated in FIG. 2A.

Connected to the network 40 on the lower portion of FIG. 2A is a router 44. This router may be used to route communications between a network 49 and the network 40. The router 44 may be connected to and/or controlled by a server 46, if desired. Components connected to the network 49 further include a printer 48, a transfer station 50, a computer 52, and a network interface 54. The hardware structure of the components 44, 46, 48, 50, 52, and 54 may be implemented to correspond to the hardware structure of the router 34, the server 36, the printer 38, the transfer station 24, the computer 30, and the network interface 32. Different software programming may be utilized, if desired, in order to relay communications between the facsimile machines and/or transfer stations, as generally disclosed herein. For example, the transfer station 50 is preferably implemented to receive a message from the network 40 requesting the capabilities of a fax machine connected thereto. This transfer station 50 will route the request for capabilities and change the format of the request, if appropriate, so that the request for capabilities is appropriately transmitted to the desired fax machine. For example, if an electronic mail message is received by the transfer station 50 from the network 40 and requests capability information of a fax machine 58, the transfer station 50 may place a call over the PSTN 56 to the fax machine 58 requesting the capabilities. As an alternative, instead of using a PSTN, an alternate form of communication may be utilized in order to obtain the capabilities of a computer/fax machine 60. As an alternative to using a transfer station 50, the network interface 54 may be utilized to transmit the query of capabilities from the network 40 to a computer/fax machine 62. The communication between the network interface 54 and the computer/fax machine 62 may be made in any desired manner including by any type of network including a computer network, an Integrated Systems Digital Network (ISDN), or by any desired manner of communication.

Figure 2B:
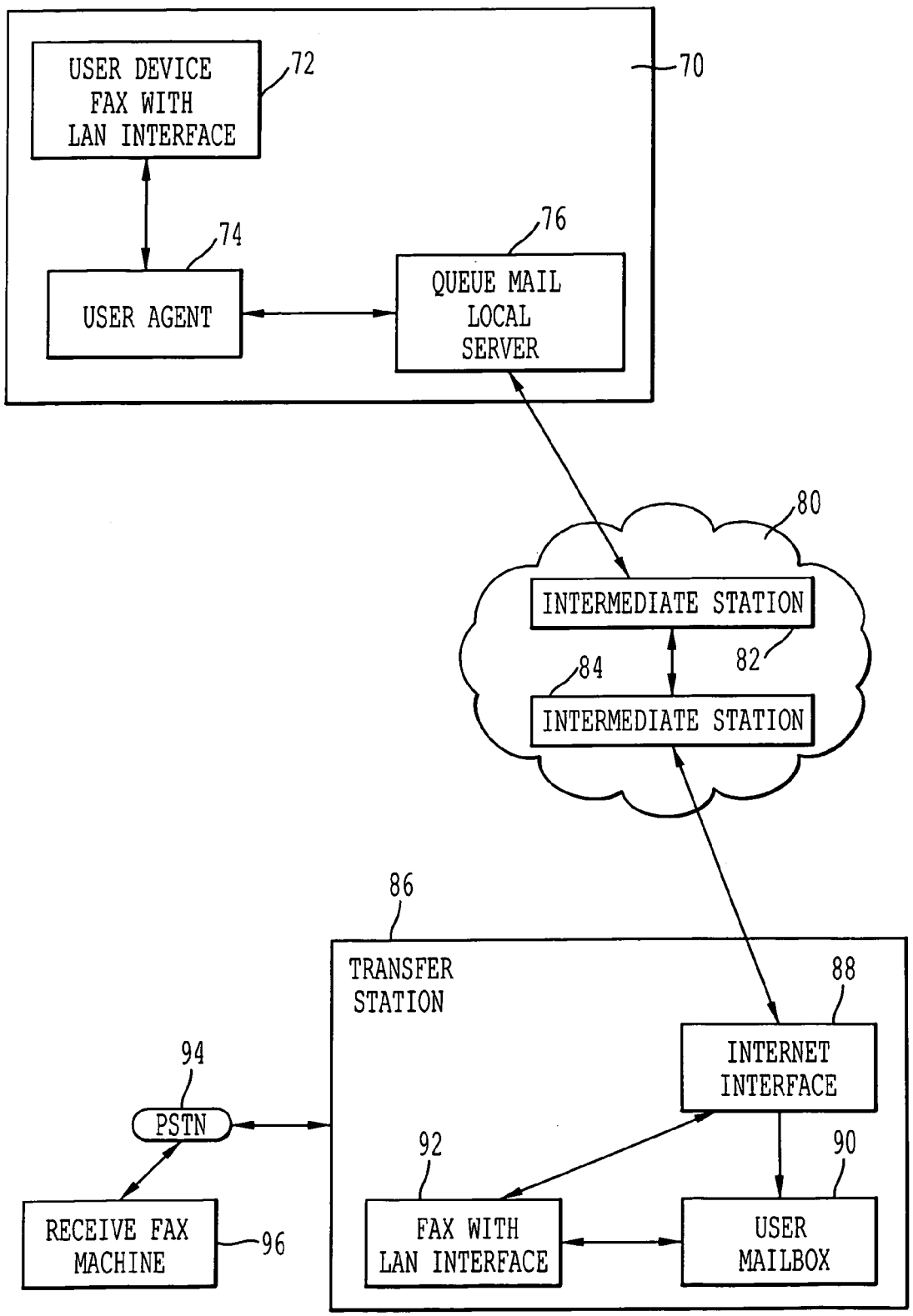
FIG. 2B illustrates an alternative system diagram in which facsimiles are transmitted over a computer network.

In a preferred embodiment of the invention, electronic mail messages are utilized to transmit requests for capabilities from a transmitting facsimile machine to a receiving facsimile machine and those capabilities are transmitted back to the transmitting facsimile machine using electronic mail. FIG. 2B illustrates an exemplary use of electronic mail to communicate information. The structure of the system of FIG. 2B may be implemented into the system of FIG. 2A if desired. Alternatively, the system of FIG. 2B can be utilized as an alternative to FIG. 2A. In FIG. 2B there is a transmitting system 70 which includes a user device with a LAN interface 72. This user device 72 is connected to a user agent 74. The controlling of transmission and receipt of electronic mail and/or the storing of this mail may be performed by a queue mail local server 76 which is connected to a network 80 which may be implemented as the Internet or in a similar manner as the network 40 is implemented in FIG. 2A. The network 80 may include intermediate stations 82 and 84 which relay electronic mail to a transfer station 86. The transfer station 86 includes an interface such as an Internet interface 88. A user mailbox 90 may be utilized to store electronic mail messages and a fax machine 92 may be utilized which has a LAN interface. The fax 92 with the LAN interface may be utilized to receive the electronic mail messages and relay using a PSTN 94 the messages to and from a receiving fax machine 96. In an embodiment of the invention, the facsimile communications over PSTNs may be implemented in accordance with the G3 facsimile standard although any other type of facsimile transmission protocol may be utilized, if desired in this invention.

FIG. 2B is intended to provide some additional information as to how electronic mail messages are to be sent. As an alternative to using the system illustrated in FIGS. 2A and 2B, any type of electronic mail systems may be used. For example, a conventional manner of utilizing electronic mail messages utilizes TCP/IP and the Simple Mail Transfer Protocol (SMTP). Details of utilizing such a mail system are set forth in the book, *TCP/IP Illustrated*, Volume 1, by Stevens, 1994, published by Addison-Wesley, and more specifically Chapter 28. The entire book *TCP/IP Illustrated* is incorporated by reference.

FIG. 3 illustrates, in block diagram format, the structure of a fax machine and/or transfer station utilized in the system of FIGS. 2A and/or 2B. A CPU 100 may be implemented using any desired microprocessor, microcontroller, or other circuitry which can control the functions of the fax machine and/or transfer station. There is a communication interface 102 which may be utilized to connect to a computer network or a PSTN. The communication interface 102 may be implemented to have the structure and function of a fax interface and/or a LAN or other network interface. A ROM 104 may be utilized to store computer instructions which control the machine and is preferably a non-volatile memory. A RAM 106 stores parameters and information during processing and may serve as a working memory. While a RAM is illustrated, any type of read/write memory system may be utilized in conjunction with the CPU 100. An option interface 106 may be utilized to connect to options of the fax machine and/or transfer station such as different paper feeders, billing tracking equipment, or any other equipment. A storage interface 110 is connected to a non-volatile memory 112, a hard disk 114, and a CD which may be a CD ROM drive, a write once/read many drive, a read/write drive which allows re-writing of data on the same disk, a magneto optical disk, or any other type of disk. The non-volatile memory may be limited as a RAM having a battery back-up, a flash memory, EPROM, EEPROM, CMOS battery, hard disk, or any other non-volatile memory device. The non-volatile memory 112 may be utilized to store autodial or speed dial telephone numbers. Additionally, or alternatively, the non-volatile memory 112 is utilized to store profile or capabilities data. This data may be from facsimile machines with which the device of FIG. 3 communicates, or may be utilized to store the options and capabilities of the device illustrated in FIG. 3. An interface controller 118 is connected to an operation panel 120 which preferably includes both a display which displays information to a user, and a keypad or a keyboard which may be utilized to input information by the user. An exemplary operation panel is illustrated in FIG. 4.

The various elements of FIG. 3 are connected by a system bus 124. A clock/timer 124 may be utilized to determine the duration of an event, or count up or count down a particular time period. Connected to the system bus is a LAN interface 126 which may be utilized to connect the transfer station or facsimile machine to a LAN. This LAN interface may be used in addition to or as an alternative to the network communication capabilities of the communication interface 102. A fuser is utilized to fuse an image onto a piece of paper. A sorter 130 can be used to sort papers which have been generated and output. A paper feed controller 132 may be utilized to control the feeding of paper to have an image printed thereon, and a large tray unit 134 may be utilized to store paper to have images printed thereon. A printer 136 is utilized to print images on a paper and may be any type of printing device, such as a laser printer, ink jet printer, impact printer, LED printer, or another type of printer. A scanner 138 is utilized to scan images of documents which are to be transmitted by facsimile.

Figure 4:
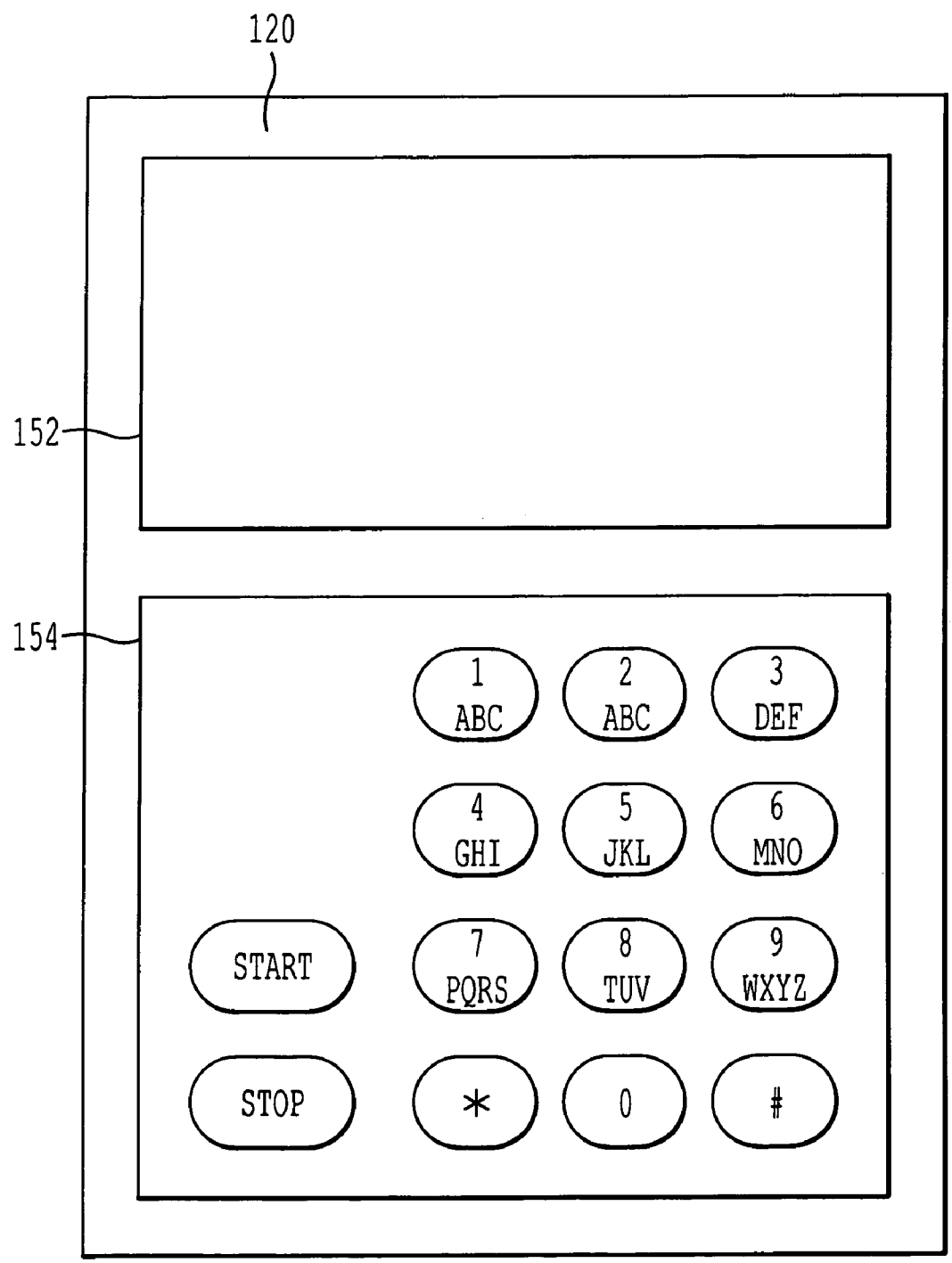
FIG. 4 illustrates a display and key pad which may be utilized on a facsimile machine or transfer machine of the invention.

FIG. 4 illustrates the operation panel 120 and includes a display 152 and a keypad 154. The display 152 is preferably an LCD display, although any type of display can be used including a LED display, a plasma display, or a cathode ray tube (CRT). Any type of information may be displayed to the user on the display 152, as desired.

The keypad 154 is an exemplary keypad for inputting information from a user and contains alphanumeric keys and a stop and start button. The keypad 154 illustrated in FIG. 4 is a simplified keypad and more complicated keypads may be utilized such as the keypads which exist on any type of conventional facsimile machines, including Ricoh facsimile machines, such as the Ricoh FAX5000L, FAX2000L, and the Ricoh SFX4800MD, each of which may be utilized with the present invention and are incorporated herein by reference. Further, a computer keyboard and computer display may be utilized as an alternative to the keypad 154 illustrated in FIG. 4.

Figure 5:
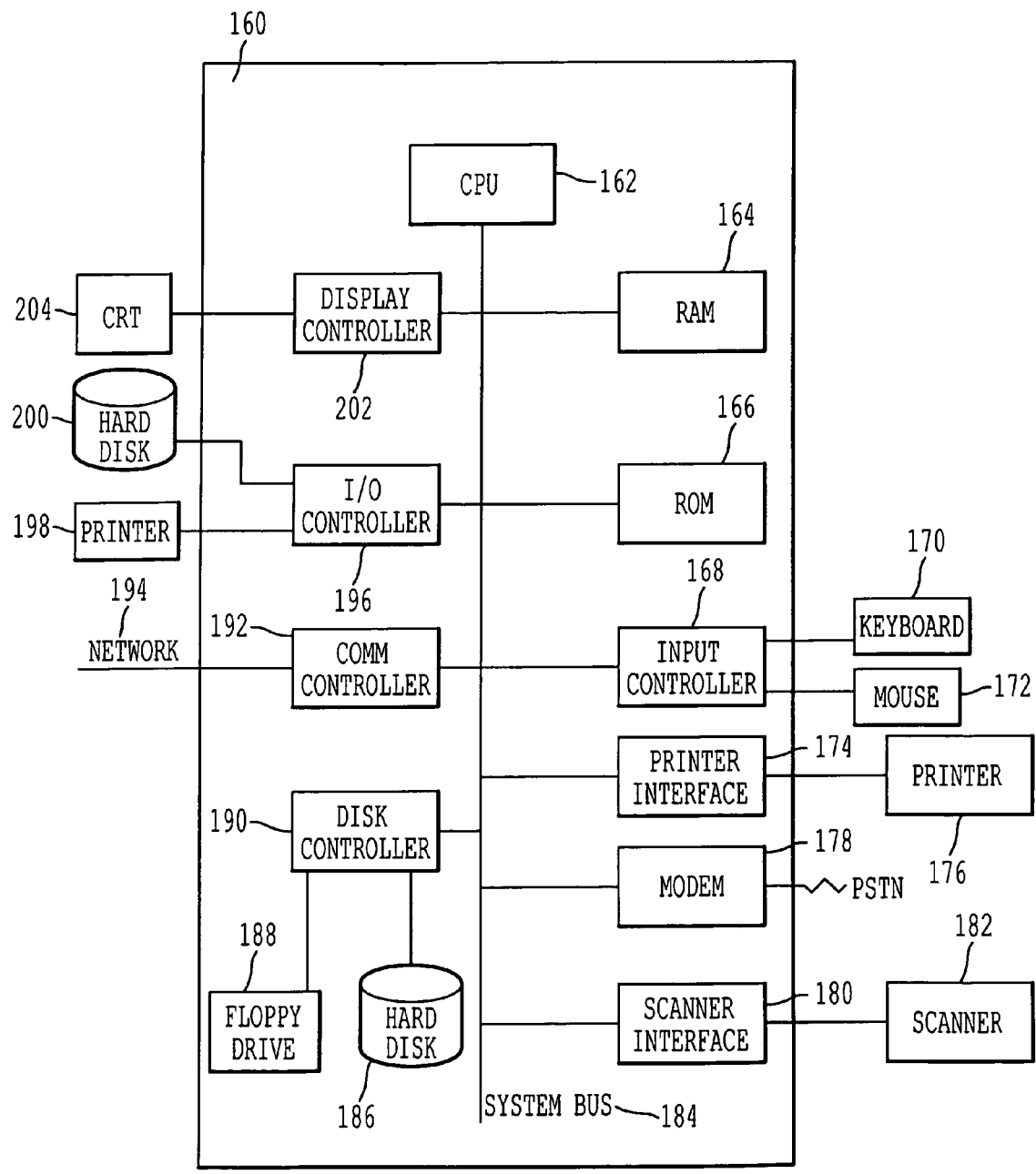
FIG. 5 illustrates a computer or a computer/facsimile machine utilized by the present invention.

FIG. 5 illustrates a computer or computer/fax machine 160 which may be utilized with the invention, for example, as one of the computers, computer/fax machines, or transfer stations of FIG. 2A. Additionally, components in FIG. 5 may be utilized in the device illustrated in FIG. 3 and vice versa. In the computer or computer/fax machine of FIG. 5, a CPU 162, which may be implemented as described with respect to the CPU 100 in FIG. 3, is utilized to control the device 160. Preferably, the CPU 162 is a microprocessor or a microcontroller, but other types of controlling devices or processing units may be utilized. A RAM 164 serves as a working memory, and a ROM 166 stores instructions which are executed by the CPU 162 in order to control the device 160. An input controller 168 interfaces with a keyboard 170 and mouse 172 which are utilized to input commands and information from a user. A printer interface is connected to any desired type of printer 176. A modem 178 may be utilized to transmit information over a PSTN and may be implemented by a modem capable of transmitting facsimiles. A scanner interface 180 is connected to a scanner 182 which may include a CCD in order to scan images. The scanner 182 may be implemented as any type of scanning device, as desired. The scanner 182 allows the digitalization of images so that these images can be transmitted as a facsimile or in another manner electronically, as described herein. A system bus 184 connects the various components of the device 160.

A disk controller 190 is connected to a floppy disk drive 188 and a hard disk drive 186. The hard disk drive may be utilized to store the profile or capabilities information discussed herein. As an alternative, the profile information or capabilities information may be stored in another type of non-volatile memory such as a CMOS memory or a RAM having a battery back up. Alternatively, a flash memory or an EEPROM may be utilized to store the desired information. A communication controller 192 interfaces the device 160 with a network 194. An input/output controller 196 is connected to a printer 198 and a hard disk drive 200 which may be external to the device which houses the components of the device 160. A display controller 202 is connected to a CRT 204 but an alternative type of display, such as an LCD display, or a plasma display, for example, may be utilized.

Figure 6A:
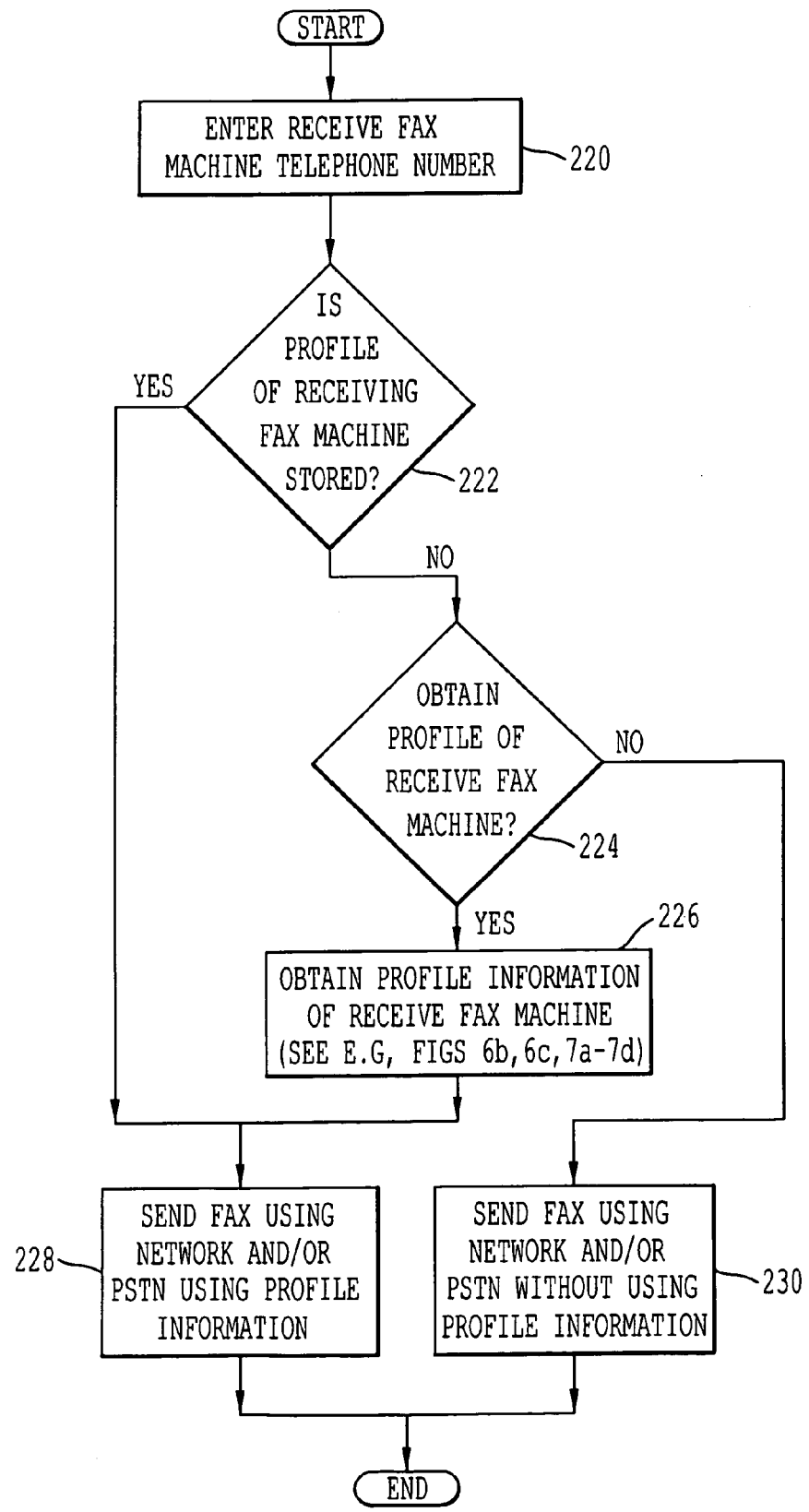
FIGS. 6A–6C are a flowchart used to obtain the capabilities of a receiving facsimile machine by the transmitting facsimile machine and also shows the use of those capabilities in order to transmit a facsimile.

FIG. 6A illustrates the general operation of the present invention which obtains the profile or capabilities information from a fax machine which is to receive an incoming facsimile transmission. In FIG. 6A, after starting, a user enters or otherwise indicates the telephone number of the receiving fax machine or other identification of the fax machine to which a facsimile is to be transmitted. Step 222 then determines if the profile or capabilities information of the receiving fax machine is already stored. If this information already is stored, flow proceeds to step 228 which sends the fax utilizing a network such as the Internet and/or a PSTN using the profile information. The profile information is utilized in order to preferably transmit the fax image utilizing the maximum capabilities of the receiving fax machine. Alternatively, there may be some reason why it is not desired to use the maximum capabilities of the receiving fax machine and therefore, there is no requirement that the maximum capabilities of the receiving fax machine be utilized. As in conventional facsimile machines, the user may select the desired transmitting features such as detail mode or half-tone mode, and if these features exist in the receiving fax machine, they will be utilized.

If step 222 determines that the profile or capabilities information of the receiving facsimile machine are not known, flow proceeds to step 224 in order to determine if it is desired to obtain the profile information of the receiving fax machine. If there is no desire to obtain the profile information of the receiving fax machine, flow proceeds to step 230 which sends a facsimile using a network and/or PSTN without using profile information. This facsimile transmission of step 230 will preferably default to a standard capability or low capability which the receiving facsimile machine probably has. Alternatively, step 230 may be performed by transmitting the fax using default transmission parameters, but such a transmission is performed without using profile information as this profile information is not stored at the transmitting fax machine and it was indicated that there was no desire to determine or obtain this profile information.

If step 224 of FIG. 6A determines that the user desires to obtain the profile or capabilities of the receiving fax machine, flow proceeds to step 226. In step 226, the profile or capabilities information is obtained or is attempted to be obtained in accordance with the flowcharts illustrated in FIGS. 6B, 6C, and/or 7A–7D.

Figure 6B:
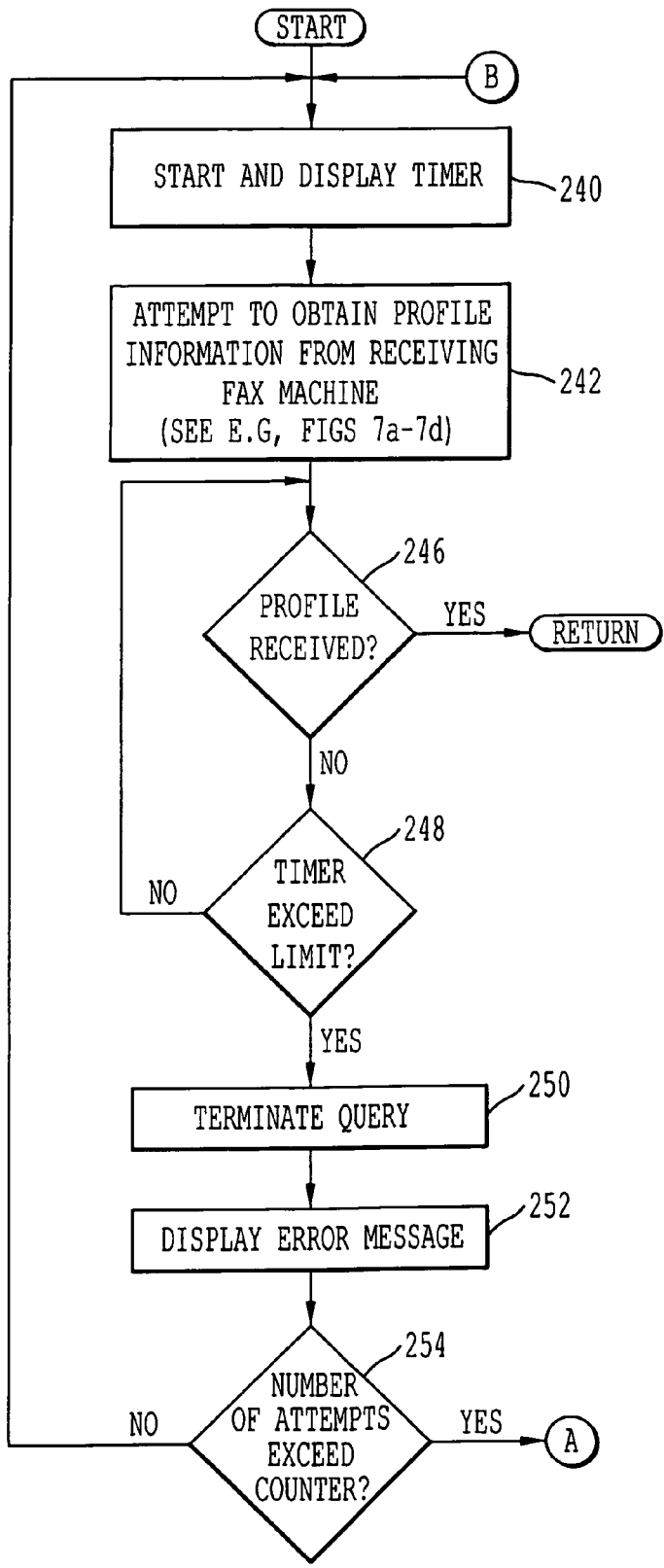

In FIG. 6B, the process of which is performed in response to the execution of step 226 of FIG. 6A, a timer such as clock/timer 125 of FIG. 3 is started in step 240 and the running time is displayed. The purpose of the timer is to allow the user at the transmitting facsimile machine to know that the machine is waiting for a response from the receiving fax machine which provides the capabilities of the receiving fax machine. Because Internet electronic mail may not be instantaneous, especially across longer distances such as transcontinental distances, a timer can be used to indicate the duration of an attempt to obtain the profile information and can allow the user to continue or abort the attempt, depending upon how much time is being taken. Any desired time period can be utilized and in one embodiment, an exemplary time of 2 minutes is used as a waiting time period to obtain the capability information of the receiving fax machine. As the speed of Internet e-mail increases with time and becomes more reliable, the duration of the timer may be reduced, as appropriate. Alternatively, if a particularly long time is necessary for Internet e-mail communication, the time may be increased beyond 2 minutes and may be set to a time such as 5 minutes, for example.

After the timer is started in step 240, step 242 of FIG. 6B attempts to obtain the profile information from the receiving fax machine. The present invention envisions a number of ways in which this profile information can be obtained and for exemplary manners of attempting to obtain the information are illustrated in FIGS. 7A–7D, respectively. The processes of FIGS. 7A–7D are explained below, after the explanation of FIGS. 6B and 6C.

After step 242 is executed, for example, in accordance with the flowcharts, flow proceeds to step 246 which determines if the profile or capabilities information has been successfully received. If step 246 determines that the profile information has been received, flow returns to the calling process e.g., flow proceeds from step 226 of FIG. 6A to step 228 of FIG. 6A. If step 246 determines that the profile information has not been successfully received, flow proceeds to step 248 to determine if the timer has exceeded the preset time limit. For example, if the timer is set for two minutes, and the timer exceeds two minutes, flow proceeds to step 250. If the timer has not exceeded the limit, flow loops back to step 246 where again it is checked to see if the profile information has been received.

If step 248 determines that the timer has exceeded the limit, the waiting for a response to the query is terminated in step 250, and an error message is displayed in step 252. This error message may be displayed, for example, on the display 152 illustrated in FIG. 4. In step 254, it is determined if the number of attempts to obtain the profile information has exceeded a counter or a predetermined count. The counter may be implementing a programmed microprocessor, or alternatively, is implemented using dedicated hardware. A counter may be utilized to allow a repeated number of attempts to obtain the profile information. For example, three attempts may be performed in order to obtain the profile information and if the counter determines that only one attempt has been made and three attempts are permissible to this particular user, flow loops back and the process of FIG. 6B starts again. Both the number of attempts which are set in the counter and the time which is permitted to be waited to receive a response may be entered by a user of the transmitting facsimile machine, may be set at the factory, or may be programmed in a remote manner. If step 254 determines that the number of attempts has exceeded the maximum number of attempts which are permissible, then flow proceeds to process A illustrated in FIG. 6C. It is to be noted that the timing and counting functions are optional and not required by the invention, and one or both may be implemented, if desired.

Figure 6C:
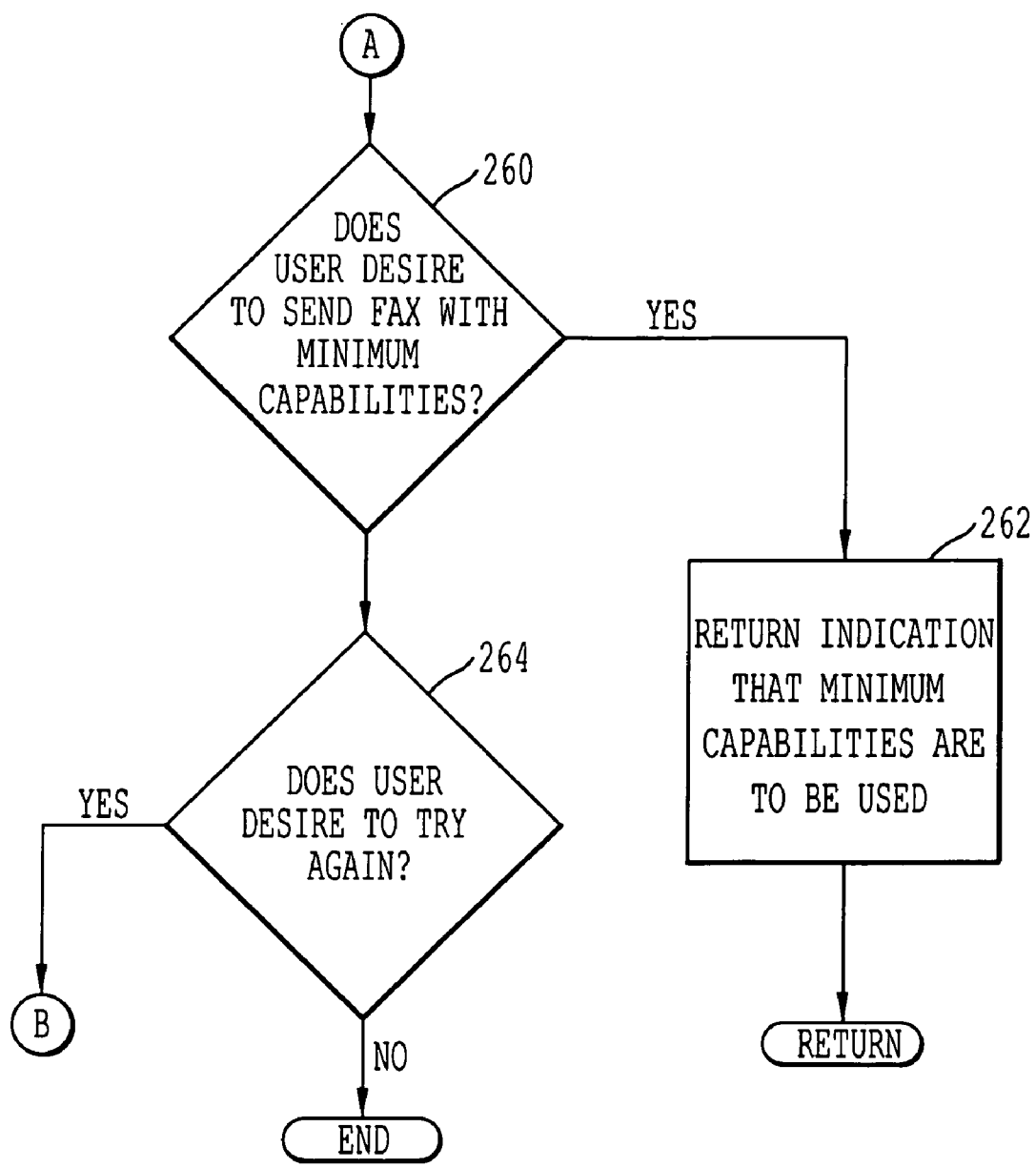

In FIG. 6C, a query is made in step 264 to determine if the user desires to send the facsimile with the minimum capabilities. This query can be formed by displaying a question to the user of the transmitting facsimile machine and allowing the user to select whether he desires the facsimile to be transmitted, even if the capability information or profile of the receiving fax machine is not received. If the user does desire to send the facsimile with the minimum capabilities as it does not know the capabilities of the receiving fax machine, flow proceeds to step 262 which returns an indication (for example to the process of FIGS. 6A and/or 6B) that minimum capabilities are to be used when transmitting the fax. Flow then returns to step 228 of FIG. 6A which sends the fax using these minimum capabilities. Alternatively, if it is determined in step 260 that the user does desire to send the fax with minimum capabilities, flow proceeds to process B at the top of FIG. 6B and there is a subsequent attempt to obtain the profile information from the receiving facsimile machine. If the user does not desire to try again and does not desire to send the fax with the minimum capabilities, from step 264 of FIG. 6C, the process ends.

Figure 7A:
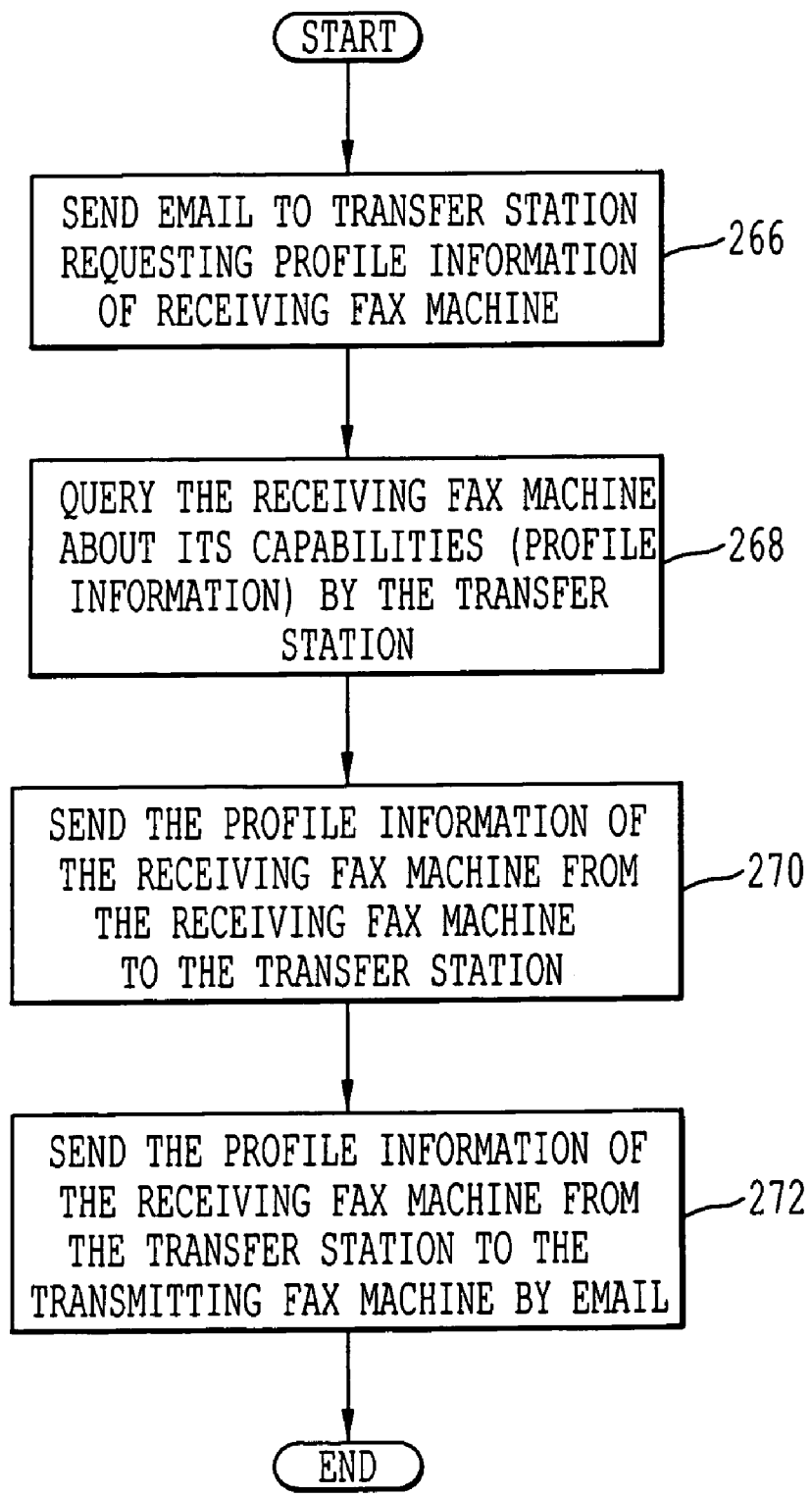
FIG. 7A is a flowchart used to obtain profile information of a receiving facsimile machine.

As explained above, FIGS. 7A–7D illustrate four different methods for obtaining profile information from the receiving facsimile machine. While these methods are illustrated as separate methods, features which are characteristic of any one of the methods may be applied to any other of the methods. Further, features from more than one of the methods may be applied to the other methods, in any manner desired. Thus, the present invention expressly includes the concept of combining the various features of the flowcharts in any desired manner. FIG. 7A is a flowchart of the basic operation of the invention which allows the transmitting facsimile machine to obtain the profile information of the receiving fax machine. After starting, step 266 sends an e-mail to the transfer station requesting profile information of the receiving facsimile machine. For example, referring to FIG. 2A, the transfer station being referred to is transfer station 50 and the e-mail is sent over the network 40 which is preferably the Internet, although it may be any desired computer network, as explained above. The e-mail which is sent to the transfer station 50 is generated by the transfer station 24 in response to a communication from the fax machine 20 or the computer/fax machine 26. As an alternative, the e-mail may be directly generated by the computer/fax machine 28 without going through the transfer station 24, transmitted over the network 40, to the transfer station 50. In step 268, there is a query of the receiving fax machine about its capabilities by the transfer station. For example, transfer station 50 may query the fax machine 58 and/or the computer/fax machine 60. As an alternative, the e-mail may be transmitted over network 40 to the network interface 54 and go to the computer/fax machine 62 without going through a transfer station.

In step 270, the profile information of the receiving fax machine which sets forth the capabilities of the receiving fax machine is sent or transmitted from the receiving fax machine to the transfer station. The transfer station can request and obtain the capabilities of the fax machine 58 and/or 60 in a number of ways. In one manner, the transfer station initiates a call and indicates to the receiving fax machine that profiling information has been requested. In response to this query, the profile information is transmitted back to the transfer station. As an alternative, the transfer station simply may place a call to the receiving facsimile machine in a conventional manner. In order to set up the facsimile transmission between the transfer station and the fax machine, profile information is conventionally provided and once the profile information is received in a conventional manner at the transfer station, the transfer station does not follow by immediately sending image information but simply hangs up or drops the line. However, if there is a hang-up after the profile information is obtained, a person at the receiving facsimile machine may wonder if their facsimile machine is properly working or if it is defective. Further, a person who is operating the receiving fax machine may wonder who is calling the fax machine and then hanging up. In order to address this issue, it is possible to indicate through the e-mail communications and the communication from the transfer station to the fax machine the voice phone number of the person transmitting the request for profile information, the fax phone number of the transmitting fax machine, and/or the transfer station phone number. This allows a report to be printed at the receiving facsimile machine indicating who is obtaining the profile information therefrom. This information may be printed out on a transmission confirmation report ("TCR") at the receiving fax machine. As yet another alternative, the call can be initiated between the transfer station and the receiving fax machine and displayed on the receiving fax machine is the identification of the transfer station and/or the transmitting fax machine. If desired, the print out of the information can be eliminated. After the profile information is received by the transfer station, the profile information is transmitted back to the transmitting fax machine by e-mail. The process of FIG. 7A then ends. It is to be noted that in the process of FIG. 7A and with the invention in general, other modes of communication may be utilized besides e-mail, and communication over the World Wide Web may be utilized without using e-mail. The information which is queried in step 268 of FIG. 7A can be any type of information related to parameters controlling fax machines and this type of information is set forth in detail in FIG. 8A.

FIG. 7B illustrates an alternative to the process of communicating to that illustrated in FIG. 7A, although any feature of FIG. 7A may be applied to FIG. 7B or any of the other figures, and vice versa. FIG. 7B utilizes two transfer stations such as transfer stations 24 and 50 illustrated in FIG. 2A in order to have the transmitting fax machines such as fax machine 20 and/or computer/fax machine 26 obtain the profile information from fax machine 58. In FIG. 7B, after starting, step 280 sends a communication over the PSTN from the transmitting machine to the first transfer station requesting profile information of the receiving fax machine. As an alternative, if a computer/fax machine such as machine 26 is used, it may not be necessary to utilize a PSTN. In step 282, the request is received by the transfer station, such as transfer station 24, and the first transfer station transmits an e-mail to the second transfer station which may be, for example, transfer station 50. This e-mail requests the profile information of the receiving fax machine. In step 284, the receiving fax machine is queried about its capabilities by the second transfer station. For example, the transfer station 50 queries fax machine 58 and/or computer/fax machine 60 of its capabilities. The profile information of the receiving facsimile machine is then sent to the second transfer station in step 286. In step 288, the profile information of the receiving fax machine is sent from the second transfer station to the first transfer station using e-mail. Again, while e-mail is one preferred use of operating the present invention, other forms of communicating may be utilized. The other forms of communication, if used, may be implemented so that they do not establish a direct and constant link between the transmitting and receiving fax machines. If such a link were established, it may be desirable to perform a query of the capabilities of the receiving fax machine instantly, as is done in conventional systems. However, in the present invention, there is no direct and constant connection between the two fax machines, and therefore, a separate communication for obtaining the capabilities of the receiving facsimile machine is performed. This is unlike conventional facsimile machines in which a single communication is utilized to obtain both the profile capabilities of the receiving facsimile machine and transmit the message. A conventional manner of obtaining profile information during a call set up G3 facsimile machines is set forth in the ITU-T Recommendation T.30, adopted July of 1996, which is incorporated herein by reference. Additionally, the T.30 Recommendation may be utilized to obtain the profile information or capabilities of the fax machine 58 by the transfer station 50.

After the transfer station obtains the profile information, this profile information may be transmitted from the second transfer station to the first transfer station over the network 40, illustrated in FIG. 2A. Subsequently, in step 300, the profile information of the receiving facsimile machine is then transmitted from the first transfer station back to the transmitting fax machine. This transmitting may be performed, if desired, over the PSTN 22 of FIG. 2A, or may be done in an alternative manner to the computer/fax machine 26. The process of FIG. 7B then ends.

Figure 7C:
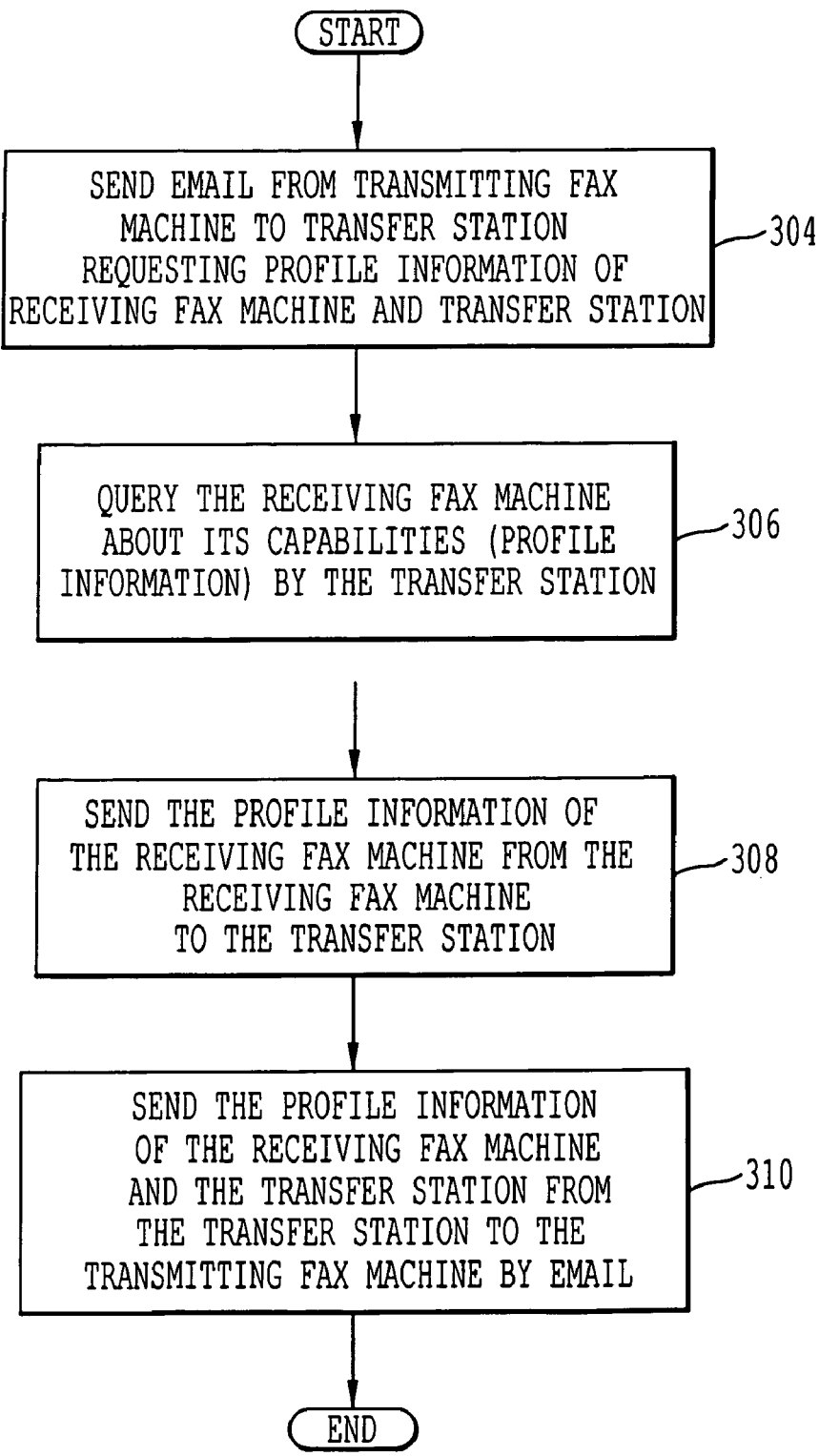
FIG. 7C is a flowchart of a process of obtaining the capabilities of a receiving facsimile machine in which the transmitting facsimile machine can generate and transmit electronic mail messages.

FIG. 7C illustrates an alternative manner of requesting the capabilities in which it is possible for the transmitting facsimile machine to directly generate and/or transmit e-mails. For example, the computer/fax machine 28 of FIG. 2A has these capabilities. In addition to or as an alternative to these capabilities, the receiving fax machine has the capabilities of generating, receiving, and/or transmitting e-mail messages. Moreover, in FIG. 7C, the capabilities of both the transfer station which communicates with the receiving fax machine and the receiving fax machine are sent to the transmitting fax machine.

Another issue which may be considered is whether the transfer station itself has capabilities which are as high as the receiving fax machine. If both the receiving fax machine and the transmitting fax machine have high capabilities, but the transfer station which communicates with the receiving fax machine does not have one of the capabilities, then it may not be possible to use that capability. Thus, the communication can only be as good as its weakest link. Therefore, the process of FIG. 7C not only sends the capabilities of the receiving fax machine to the transmitting fax machine, but also transmits the capabilities of the transfer station to the receiving fax machine. As an alternative to this method of transmitting both sets of capabilities, it may be desirable or possible to determine the common capabilities of the transfer station and fax machine connected thereto. Thus, two different profiles do not need to be transmitted to and stored at the transmitting fax machine, but one profile can be generated which has the common capabilities of both machines.

In FIG. 7C, after starting, an e-mail is sent from the transmitting machine to the transfer station requesting profile information of the receiving machine and the transfer station. This e-mail does not necessarily need to be generated by the transmitting fax machine itself, but may be transmitted by a transfer station such as the transfer station 24, in response a communication from the fax machine 20 or 26. In step 306, the receiving fax machine is queried about its capabilities by the transfer station, such as the transfer station 50. The profile information of the receiving fax machine is then sent from the receiving fax machine to the transfer station. Then, in step 310, the profile information of the receiving fax machine and the transfer station, such as the transfer station 50, is transmitted to the transmitting fax machine utilizing e-mail. While e-mail is utilized, it is not required that the e-mail be transmitted to the transmitting fax machine, but the e-mail may go to a transfer station, such as the transfer station 24. Therefore, in accordance with the process of FIG. 7C, the transmitting fax machine learns the capabilities of both the transfer station and the receiving fax machine. It is also possible to transmit the capabilities of either one of or both of the transfer stations illustrated in FIG. 2A be transmitted to the transmitting fax machine.

Figure 7D:
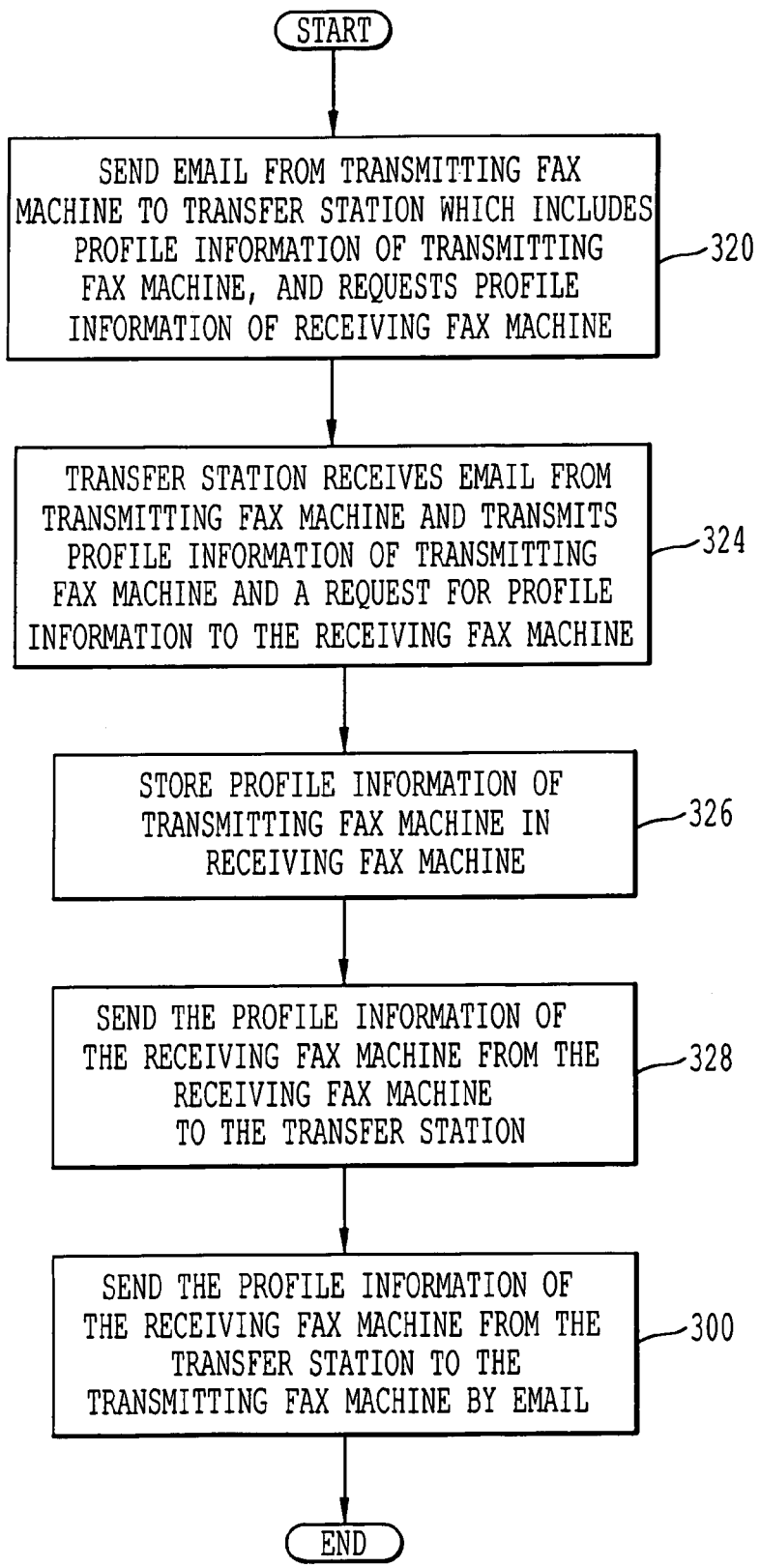
FIG. 7D is a flowchart illustrating a process of obtaining the capabilities of a receiving facsimile machine and also transmitting the capabilities of the transmitting facsimile machine to the receiving facsimile machine.

FIG. 7D illustrates an alternative embodiment of the invention in which the profile information or capabilities of the transmitting machine are transmitted to the receiving facsimile machine, in addition to the receiving facsimile machine transmitting the capabilities thereof to the transmitting fax machine. In FIG. 7D, after starting, in step 320, an e-mail is sent from the transmitting fax machine to the transfer information which includes the profile information of the transmitting fax machine, and requests profile information of the receiving fax machine. In this step, it is not necessary for the e-mail to be generated directly from the transmitting fax machine, but the e-mail may be generated by the transfer station, such as the transfer station 24, in response to a message from the fax machine 20. In step 324, the transfer station (such as the transfer station 50) receives the e-mail which was originated in response to a communication from the transmitting fax machine and the transfer station transmits this profile information of the transmitting fax machine and a request for profile information to the receiving fax machine. In step 326, the receiving fax machine stores the profile information of the transmitting fax machine. In step 328, profile information of the receiving fax machine is sent from the receiving fax machine to the transfer station, such as the transfer station 50. In step 330, the profile information of the receiving fax machine is then transmitted from the transfer station utilizing e-mail and ultimately ends up at the transmitting fax machine 20.

Figure 8:
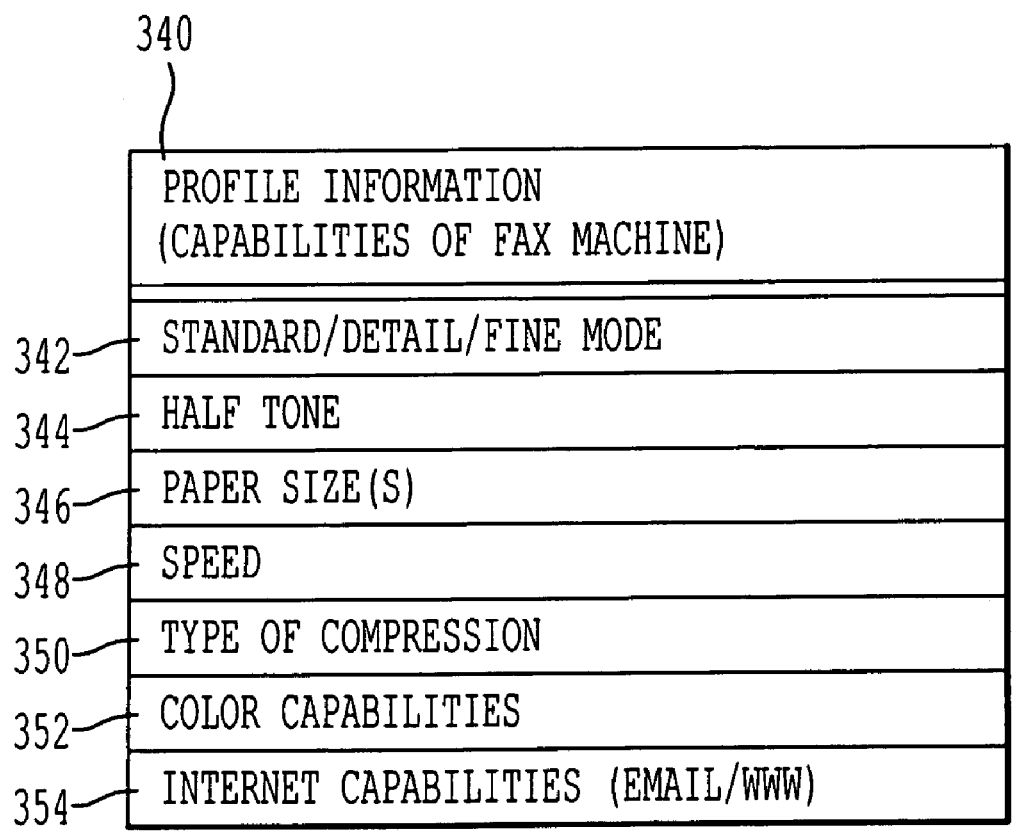
FIG. 8 illustrates a data structure of profile information which is the capabilities of a facsimile machine and the fields containing information which may be obtained.

FIG. 8 illustrates a data structure 340 which includes the profile information of a fax machine which sets forth the capabilities of the fax machine. The data structure 340 includes a field 342 which indicates whether the fax machine can transmit in standard, detail, and/or fine mode. Field 344 indicates whether the fax machine has half tone capabilities, and field 346 indicates the various paper sizes which can be utilized by the fax machine. Field 348 illustrates the maximum transmission speed of the fax machine and can be, for example, 2.4 K, 4.8 K, 9.6 K, 14.0 K, 19.2 K, 32.0 K, 48.0

K, 56.0 K, 64.0 K, 128.0 K, or another transmission speed. Any other speed information may be stored, if desired.

There is also a field 350 which indicates the type of compression or compressions which are usable with the fax machine. These compressions also relate to communication protocols which may be utilized. Therefore, in addition to the type of compression, or as an alternative to the type of compression, the protocol type may be stored in the data structure. Exemplary protocols which may be used are G3, VT, MIL-STD 161 A, B, C, etc. A field 352 may be utilized which indicates if the facsimile machine has color capabilities, and a field 354 indicates whether the fax machine has the capabilities of communicating over the Internet. For example, the facsimile machine may be able to accept communications or images through e-mail or over the World Wide Web instead of using a PSTN. The Internet capabilities may also include the e-mail address of the fax machine, and/or, the IP address of the fax machine. The data structure of FIG. 8 can be an attached file to an e-mail, or alternatively, may be within the body of an e-mail message. Other types of profile information or capabilities may be used, as desired. Exemplary types of information are set forth in U.S. Pat. No. 5,938,735 to Malik, which is incorporated herein by reference. The '735 patent does disclose concepts which are related to the present invention and any one of the concepts utilized in the '735 patent may be utilized with the present invention.

FIG. 9A illustrates an exemplary electronic mail message 360. This electronic mail is transmitted to the e-mail address of the transmitting facsimile station, as indicated in field 362. Field 364 indicates that the subject of the e-mail message is the response profile of a fax machine at a specific telephone number. This telephone number is the telephone number of a facsimile machine such as the receiving facsimile machine. The body 366 of the e-mail 360 of FIG. 9A contains the result file and lists the capabilities of two fax machine. The fax machines may be the receiving fax machine, and the fax capabilities of the transfer station. The capability fields a. and b. of each of the two facsimile machines are left blank in this exemplary e-mail, although during actual use of the invention, the capabilities would be listed. Further, capabilities a. and b. are merely exemplary and more capabilities may be included and transmitted, if desired. Further, this e-mail is merely exemplary in nature and other forms of e-mail communication or communication over the Internet, such as the World Wide Web may be utilized. Further, this e-mail of FIG. 9A is intended to be transmitted to an e-mail address of the transmitting station or transmitting facsimile machine. However, in alternative embodiments, it is possible that the transmitting facsimile machine does not have e-mail capabilities but the e-mail capabilities are between transfer stations.

The e-mail of FIG. 9B is an exemplary mail utilized to request the profile of a facsimile machine which has the telephone number listed in the subject line 374 of the e-mail 370. The "To:" line 372 indicates that the e-mail is to be transmitted to the transfer fax station. The body 380 is left blank, indicating a need for the result profile. The e-mail of FIG. 9B may originate from the transmitting fax machine, or alternatively, may originate from a transfer station.

The mechanisms and processes set forth in the present invention may be implemented using a conventional general purpose microprocessor programmed according to the teachings of the present specification, as will be appreciated to those skilled in the relevant arts. Appropriate software coding can be prepared by skilled programmers based on the teachings of the present disclosure, as will be apparent to those skilled in the relevant arts. The present invention may also be implemented utilizing alternative structure such as through special purpose or specially programmed hardware such as programmable logic arrays, and any other type of processing system.

The present invention also includes a computer based product which may be hosted on a storage medium and includes instructions which can be used to program a computer to perform a process in accordance with the present invention. The storage medium can include, but is not limited to, any type of disk including floppy disks, optical disks, CD-ROMs magneto-optical disks, ROMs, RAMs, EPROMs, EEPROMs, flash memory, magnetic or optical cards, or any other type of media suitable for storing electronic instructions.

Obviously, numerous modifications and variations of the present invention are possible in light of the above teachings. It is therefore to be understood that within the scope of the pending claims, the invention may be practiced otherwise than as specifically described herein.

What is claimed as new and desired to be secured by Letters Patent of the United States is:

1. A method of inquiring about communication capabilities, comprising:
generating, by a transmitting machine, a request for capabilities of a receiving facsimile machine;
transmitting over the Internet the request;
receiving the request which was transmitted over the Internet by a transfer machine;
generating, by the transfer machine and in response to receiving the request, a communication over a telephone network, wherein the communication is not an electronic mail message;
transmitting over the telephone network, by the receiving facsimile machine in response to the communication from the transfer machine, an indication of facsimile capabilities of the receiving facsimile machine to the transfer machine;
transmitting, by the transfer machine, the capabilities of the receiving facsimile machine over the Internet; and
receiving, by the transmitting machine, the capabilities of the receiving facsimile machine.

2. A method according to claim 1, wherein:
said step of transmitting over the Internet the request comprises transmitting an electronic mail message over the Internet; and
said step of transmitting the capabilities of the receiving facsimile machine over the Internet comprises transmitting an electronic mail message over the Internet.

3. A method according to claim 1, further comprising:
generating, by the transmitting machine, a facsimile corresponding to the capabilities of the receiving facsimile machine using the capabilities of the receiving facsimile machine which were transmitted over the Internet;
transmitting the facsimile over the Internet;
receiving the facsimile by the transfer machine;
transmitting the facsimile from the transfer machine over the telephone network by the transfer machine to the receiving facsimile machine.

4. A method according to claim 3, wherein said step of transmitting the facsimile over the Internet comprises:
transmitting the facsimile over the Internet as an electronic mail message.

5. A method according to claim 3, wherein the step of transmitting the facsimile to the receiving facsimile machine comprises:

transmitting the facsimile using maximum capabilities of the receiving facsimile machine, as indicated by the capabilities of the receiving facsimile machine.

6. A method according to claim 1, further comprising the step of:
storing the indication of the facsimile capabilities in the transmitting machine.

7. A method according to claim 5, wherein said step of storing comprises:
storing the indication of the facsimile capabilities in a memory location which is used for storing autodial information.

8. A method according to claim 1, further comprising the step of:
displaying, by the transmitting machine, an indication that the transmitting machine has an outstanding request of the capabilities of the receiving facsimile machine.

9. A method according to claim 1, further comprising the step of:
indicating, at the receiving facsimile machine, that there is a communication between the transfer machine and the receiving facsimile machine.

10. A method according to claim 9, wherein said step of indicating comprises:
displaying on a display of the receiving facsimile machine that there is communication between the transfer machine and the receiving facsimile machine.

11. A method according to claim 10, wherein said step of displaying comprises:
displaying an identification of the transfer machine.

12. A method according to claim 10, wherein said step of displaying comprises:
displaying an indication that the transfer machine has requested the capabilities of the receiving facsimile machine.

13. A method according to claim 9, wherein said step of indicating comprises:
printing a report at the receiving facsimile machine.

14. A method according to claim 1, wherein:
the step of generating comprises generating, by the transmitting machine, the request as an electronic mail message.

15. A method according to claim 1, further comprising the step of:
transmitting capabilities of the transmitting machine over the Internet to the receiving facsimile machine.

16. The method according to claim 1, wherein:
the capabilities of the receiving facsimile machine include at least one of color capabilities, Internet capabilities, and information regarding paper sizes.

17. A method according to claim 1, wherein the step of generating comprises:
generating the request by the transmitting machine, wherein the transmitting machine has a connection to a local area network.

18. A method according to claim 17, further comprising the step of:
transmitting, by the transmitting machine, the request over the local area network before the request is transmitted over the Internet.

19. A system for inquiring about communication capabilities, comprising:
means for generating, by a transmitting machine, a request for capabilities of a receiving facsimile machine;
means for transmitting over the Internet the request;
means for receiving the request which was transmitted over the Internet by a transfer machine;
means for generating, by the transfer machine and in response to receiving the request, a communication over a telephone network, wherein the communication is not an electronic mail message;
means for transmitting over the telephone network, by the receiving facsimile machine in response to the communication from the transfer machine, an indication of facsimile capabilities of the receiving facsimile machine to the transfer machine;
means for transmitting, by the transfer machine, the capabilities of the receiving facsimile machine over the Internet; and
means for receiving, by the transmitting machine, the capabilities of the receiving facsimile machine.

20. A system according to claim 19, wherein:
said means for transmitting over the Internet the request comprises means for transmitting an electronic mail message over the Internet; and
said means for transmitting the capabilities of the receiving facsimile machine over the Internet comprises means for transmitting an electronic mail message over the Internet.

21. A system according to claim 19, further comprising:
means for generating, by the transmitting machine, a facsimile corresponding to the capabilities of the receiving facsimile machine using the capabilities of the receiving facsimile machine which were transmitted over the Internet;
means for transmitting the facsimile over the Internet;
means for receiving the facsimile by the transfer machine;
means for transmitting the facsimile from the transfer machine over the telephone network by the transfer machine to the receiving facsimile machine.

22. A system according to claim 21, wherein said means for transmitting the facsimile over the Internet comprises:
means for transmitting the facsimile over the Internet as an electronic mail message.

23. A system according to claim 21, wherein the means for transmitting the facsimile to the receiving facsimile machine comprises:
means for transmitting the facsimile using maximum capabilities of the receiving facsimile machine, as indicated by the capabilities of the receiving facsimile machine.

24. A system according to claim 19, further comprising:
means for storing the indication of the facsimile capabilities in the transmitting machine.

25. A system according to claim 23, wherein said means for storing comprises:
means for storing the indication of the facsimile capabilities in a memory location which is used for storing autodial information.

26. A system according to claim 19, further comprising:
means for displaying, by the transmitting machine, an indication that the transmitting machine has an outstanding request of the capabilities of the receiving facsimile machine.

27. A system according to claim 19, further comprising:
means for indicating, at the receiving facsimile machine, that there is a communication between the transfer machine and the receiving facsimile machine.

28. A system according to claim 27, wherein said means for indicating comprises:

means for displaying on a display of the receiving facsimile machine that there is communication between the transfer machine and the receiving facsimile machine.

29. A system according to claim 28, wherein said means for displaying comprises:
    means for displaying an identification of the transfer machine.

30. A system according to claim 28, wherein said means for displaying comprises:
    means for displaying an indication that the transfer machine has requested the capabilities of the receiving facsimile machine.

31. A system according to claim 28, wherein said means for indicating comprises:
    means for printing a report at the receiving facsimile machine.

32. A system according to claim 19, wherein:
    the means for generating comprises means for generating, by the transmitting machine, the request as an electronic mail message.

33. A system according to claim 19, further comprising:
    means for transmitting capabilities of the transmitting machine over the Internet to the receiving facsimile machine.

34. A system according to claim 19, wherein:
    the capabilities of the receiving facsimile machine include at least one of color capabilities, Internet capabilities, and information regarding paper sizes.

35. A system according to claim 19, wherein the means for generating comprises:
    means for generating the request by the transmitting machine, wherein the transmitting machine has a connection to a local area network.

36. A system according to claim 35, further comprising:
    means for transmitting, by the transmitting machine, the request over the local area network before the request is transmitted over the Internet.

37. A method of inquiring about communication capabilities, comprising the steps of:
    generating, by a transmitting machine, a request for facsimile capabilities of a receiving facsimile machine;
    transmitting over the Internet the request; and
    receiving, by the transmitting machine, the facsimile capabilities of the receiving facsimile machine, said receiving step performed after receiving, by a transfer machine, the request which was transmitted over the Internet, after generating, by the transfer machine in response to receiving the request, a communication over a telephone network, after transmitting over the telephone network, by the receiving facsimile machine in response to the communication from the transfer machine, an indication of the facsimile capabilities of the receiving facsimile machine to the transfer machine, and after transmitting, by the transfer machine, the facsimile capabilities of the receiving facsimile machine over the Internet, wherein the communication is not an electronic mail message.

38. A method of informing communication capabilities, performed in response to generating, by a transmitting machine, a request for capabilities of a receiving facsimile machine, transmitting over the Internet the request, receiving the request which was transmitted over the Internet by a transfer machine, transmitting, by the transfer machine and in response to receiving the request, a communication over a telephone network, the method comprising the steps of:
    receiving the communication from the transfer machine which was transmitted over the telephone network, wherein the communication is not an electronic mail message; and
    transmitting over the telephone network, by the receiving facsimile machine in response to the communication from the transfer machine, an indication of facsimile capabilities of the receiving facsimile machine to the transfer machine.

39. A method according to claim 38, further comprising the step of:
    transmitting, by the transfer machine, the capabilities of the receiving facsimile machine over the Internet; and
    receiving, by the transmitting machine, the capabilities of the receiving facsimile machine.

40. A method of inquiring about communication capabilities, comprising:
    generating, by a transmitting machine, a request for capabilities of a receiving facsimile machine, wherein said request is generated prior to an initiation of a facsimile call between the transmitting machine and the receiving facsimile machine;
    transmitting the request over the Internet;
    receiving the transmitted request by a transfer machine;
    generating, by the transfer machine and in response to receiving the request, a communication over a telephone network, wherein the communication is not an electronic mail message;
    transmitting over the telephone network, by the receiving facsimile machine in response to the communication from the transfer machine, an indication of facsimile capabilities of the receiving facsimile machine to the transfer machine;
    transmitting over the Internet, by the transfer machine, the capabilities of the receiving facsimile machine; and
    receiving, by the transmitting machine, the capabilities of the receiving facsimile machine.

* * * * *